(12) United States Patent
Mikkelsen (10) Patent No.: US 10,948,375 B2
(45) Date of Patent: Mar. 16, 2021

(54) PUMP SEAL LEAKAGE DETECTION SYSTEM

(71) Applicant: GRUNDFOS HOLDING A/S, Bjerringbro (DK)

(72) Inventor: Steen Mikkelsen, Bjerringbro (DK)

(73) Assignee: GRUNDFOS HOLDING A/S, Bjerringbro (DK)

(*) Notice: Subject to any disclaimer, the term of this patent is extended or adjusted under 35 U.S.C. 154(b) by 189 days.

(21) Appl. No.: 16/135,419

(22) Filed: Sep. 19, 2018

(65) Prior Publication Data

US 2019/0086286 A1 Mar. 21, 2019

(30) Foreign Application Priority Data

Sep. 20, 2017 (EP) .................... 17192130

(51) Int. Cl.
| | | |
|---|---|---|
| G01M 3/38 | (2006.01) | |
| G01M 3/16 | (2006.01) | |
| F04B 43/04 | (2006.01) | |
| F04D 15/02 | (2006.01) | |
| G08B 19/00 | (2006.01) | |
| G01M 3/18 | (2006.01) | |

(Continued)

(52) U.S. Cl.
CPC ............ *G01M 3/16* (2013.01); *F04B 43/046* (2013.01); *F04D 15/0263* (2013.01); *G01M 3/02* (2013.01); *G01M 3/04* (2013.01); *G01M 3/18* (2013.01); *G01M 3/38* (2013.01); *G08B 19/00* (2013.01); *F04D 29/10* (2013.01); *F05B 2260/603* (2013.01); *F05B 2260/80* (2013.01)

(58) Field of Classification Search
CPC .... F04D 15/02–029; G01M 3/04; G01M 3/38
See application file for complete search history.

(56) References Cited

U.S. PATENT DOCUMENTS 3,645,127 A * 2/1972 Mongodin ............ G01M 3/202
73/40.7
4,782,689 A * 11/1988 DeRome ............... G01M 3/025
73/49.2

(Continued)

FOREIGN PATENT DOCUMENTS

| EP | 2 669 525 A1 | 12/2013 |
| GB | 2 122 396 A | 1/1984 |
| WO | 98/54559 A1 | 12/1998 |

OTHER PUBLICATIONS

English Translation of EP 2669525 (Year: 2013).*

*Primary Examiner* — Alexander A Mercado
(74) *Attorney, Agent, or Firm* — McGlew and Tuttle, P.C.

(57) ABSTRACT

A pump seal leakage detection system (8) includes a leakage piping (13) including a collector pipe (21) and an air stream pipe (23), a sensor (15) positioned at the air stream pipe (23), and an air displacement device (17) for driving an air stream through the air stream pipe (23). The collector pipe (21) includes an inlet port (25) that is connectable to a leakage centrifuge (5), and an outlet port (27) into the air stream pipe (23). The sensor (15) is configured to detect a leakage drop at the outlet port (27) of the collector pipe (21) or in the air stream pipe (23). The air displacement device (17) is configured to blow a leakage drop off the outlet port (27) of the collector pipe (21) by an air stream towards an outlet port (35) of the air stream pipe (23).

18 Claims, 6 Drawing Sheets

(51) Int. Cl.
  *G01M 3/02* (2006.01)
  *G01M 3/04* (2006.01)
  *F04D 29/10* (2006.01)

(56) References Cited

U.S. PATENT DOCUMENTS

| | | | | |
|---|---|---|---|---|
| 4,888,980 A * | 12/1989 | DeRome | ................ | G01M 3/02 73/49.2 |
| 5,069,062 A * | 12/1991 | Malecek | ................ | G01M 3/02 73/45.8 |
| 5,105,653 A * | 4/1992 | Konter | ................ | G01M 3/3236 73/40 |
| 5,173,019 A * | 12/1992 | Sdano | ................ | F04D 15/0263 415/118 |
| 5,398,976 A * | 3/1995 | Webb | .................... | F16L 39/00 285/148.23 |
| 5,516,119 A * | 5/1996 | Trackwell | ............. | F16J 15/004 277/409 |
| 5,705,737 A | 1/1998 | Liao | | |
| 5,984,315 A * | 11/1999 | Burkhardt | ............... | F04B 53/04 277/500 |
| 6,250,876 B1 * | 6/2001 | Højholt | ................ | F04D 29/128 415/17 |
| 7,001,153 B2 * | 2/2006 | McDowell | ............ | F04B 43/009 417/477.1 |
| 7,284,964 B2 * | 10/2007 | McDowell | ............ | F04B 43/009 417/477.1 |
| 7,614,283 B2 * | 11/2009 | Allen | ...................... | F01P 11/16 73/49.7 |
| 9,822,775 B2 * | 11/2017 | Crowsley | ............ | F04B 43/1253 |
| 9,880,065 B1 * | 1/2018 | Miguez | ................ | G01L 9/0089 |
| 10,344,752 B2 * | 7/2019 | Brokenshire | ....... | F04B 43/0081 |
| 10,378,544 B2 * | 8/2019 | Rejniak | ................ | F04D 15/0263 |
| 2006/0252991 A1 * | 11/2006 | Kubach | .................. | G01M 3/26 600/118 |
| 2007/0240434 A1* | 10/2007 | Allen | ...................... | F01P 11/16 62/129 |
| 2007/0256478 A1 * | 11/2007 | Guadagnola | ........ | G01M 3/3254 73/40 |
| 2012/0118048 A1* | 5/2012 | Wetzig | ................ | G01M 3/205 73/40.7 |
| 2013/0047706 A1* | 2/2013 | Kim | ........................ | G01F 1/46 73/40 |
| 2014/0216451 A1* | 8/2014 | Jaffe | ...................... | A61M 16/0833 128/202.22 |

* cited by examiner

PUMP SEAL LEAKAGE DETECTION SYSTEM

CROSS REFERENCE TO RELATED APPLICATIONS

This application claims the benefit of priority under 35 U.S.C. § 119 of European Application 17 192 130.7, filed Sep. 20, 2017, the entire contents of which are incorporated herein by reference.

TECHNICAL FIELD

The present invention pertains to a pump seal leakage detection system, a pump comprising such a system and a method for detecting a leakage of a pump seal. The pump seal leakage detection system described herein is in particular applicable to vertical or horizontal wet-running multistage centrifugal pumps with a mechanical shaft seal.

BACKGROUND

Known pumps may comprise a rotatable shaft driven by an electric motor and transmitting the torque of the electric motor towards an impeller or displacer immersed in the fluid to be pumped. Wet-running multistage centrifugal pumps often comprise a mechanical shaft seal. A mechanical shaft seal ideally has a radial distance in the range of microns or less to the shaft large enough to allow for a rotation keeping friction at a minimum and small enough to keep leakage at a minimum. A certain amount of leakage may even be desirable to establish a lubricating film with a nominal thickness of less than a micron for a minimum of frictional loss.

However, over time and usage of the pump, the shaft or seal surfaces may wear out and the amount of leakage may increase. Another reason for wear in the shaft seal may be erroneous running. Once the amount or rate of leakage exceeds a tolerable level, the pump or the surrounding equipment may be damaged and/or start to underperform. Thus, it is desirable to be able to monitor the amount or rate of leakage in order to take the necessary steps before such an intolerable level of leakage is reached. In particular, pumps in wind power plants or at other installation places difficult to reach may benefit from monitoring the pump seals to prevent unexpected damage or low performance due to pump seal leakage.

A fluid leakage detector is known from WO 98/54559 A1 which describes a detector comprising a base member having a drop-catcher and an inclined fluid drainage channel with an electrical sensor for detecting passing leakage drops.

EP 2 669 525 A1 describes a centrifugal pump with a container for collecting leakage fluid, wherein the container comprises an outlet with a droplet sensor for determining the flow through the outlet.

All of the known leakage detection systems are passive in the sense that a relatively large amount of leakage fluid must be collected to allow for a leakage detection.

SUMMARY OF THE INVENTION

In contrast to the known passive leakage detection systems, the system, pump and method disclosed herein allow for detecting smaller changes in the leakage rate and/or amount with a higher accuracy in order to be able to predict an intolerable leakage rate and/or amount earlier.

The system, pump and method disclosed herein actively exploits the collection of leakage fluid being centrifuged in a leakage centrifuge of the pump and actively forms droplets of leakage fluid being blown away by an air stream.

In accordance with a first aspect of the present disclosure, a pump seal leakage detection system is provided comprising
 a leakage piping comprising a collector pipe and an air stream pipe,
 a sensor positioned at the air stream pipe, and
 an air displacement device for driving an air stream through the air stream pipe,
 wherein the collector pipe comprises an inlet port being connectable to a leakage centrifuge, the collector pipe further comprising an outlet port into the air stream pipe, wherein the sensor is configured to detect a leakage drop at the outlet port of the collector pipe or in the air stream pipe, and wherein the air displacement device is configured to blow a leakage drop off the outlet port of the collector pipe by an air stream towards an outlet port of the air stream pipe.

The radial accumulation of leakage fluid in the leakage centrifuge is used for the active droplet formation by the air stream, which allows to detect very small changes to the leakage rate and/or amount with a high accuracy in order to be able to predict an intolerable leakage rate and/or amount earlier than it was with systems known in the prior art.

The pump seal separates a wet section of the pump from a dry section of the pump, so that a pump seal has a wet side to the wet section and a dry side to the dry section. However, in particular, a mechanical shaft seal may allow for a certain leakage from the wet section into the dry section along the radial shaft surface to form a thin lubricating film. The leakage centrifuge may be any sort of peripheral volume around a rotating part of the pump, e.g. the shaft, wherein the leakage centrifuge is located at the dry side of the pump seal, and wherein the leakage centrifuge has a radial outlet port to which the collector pipe of the leakage detection system is connectable.

The air displacement device may be an air blower, an air suction device, an air pump or any other form of device that is able to drive an air stream through the air stream pipe. The air stream can be continuous, periodic, pulsating, intermittent, sporadically, and/or, preferably sensor-triggered. The air displacement device may be located in a housing accommodating the leakage piping or it may be located separately from the leakage piping. In any case, the air stream pipe is in fluid connection with the air displacement device, whether directly or via a connecting pipe or air duct. If the air displacement device is an air blower, it may be in fluid connection with an inlet port of the air stream pipe. If the air displacement device is an air suction device, it may be in fluid connection with the outlet port of the air stream pipe.

The term "drop" or "droplet" shall mean herein any completely or partially established fluid shape based on surface tension of the fluid. This means that the term "drop" or "droplet" not only refers herein to already completely separated fluid shapes, but also to partially established fluid shapes in the process of formation, e.g. a convex fluid surface due to surface tension at an outlet port.

Optionally, in a first embodiment, the sensor may be positioned at a lateral side of the air stream pipe opposite the outlet port of the collector pipe. Such a position is in particular advantageous for triggering the air stream to blow off a leakage fluid droplet from the outlet port of the collector pipe towards an outlet port of the air stream pipe. The air stream may only be activated when the sensor detects that a sufficient amount of leakage fluid to form a droplet has accumulated at the outlet port of the collector pipe. Alternatively, or in addition to this embodiment, said sensor or an additional sensor may be, in a second embodiment, positioned at a lateral side of a downstream section of the air stream pipe downstream from the outlet port of the collector pipe. Such a downstream sensor may be able to detect and/or count droplets passing the sensor through the air stream pipe towards the outlet port of the air stream pipe.

Optionally, the sensor(s) may be optical for detecting the optical reflection of the surface of leakage fluid at the outlet port of the collector pipe. This is particularly beneficial in order to trigger the air stream for blowing off a leakage fluid droplet from the outlet port of the collector pipe towards an outlet port of the air stream pipe. The droplets may then be counted by counting the trigger events for activating the air displacement device for driving the air stream. The air displacement device may be configured to drive the air stream for a pre-determined time interval upon, preferably sensor-triggered, activation and with a pre-determined power, air pressure differential and/or air flow rate sufficient to blow a droplet off the outlet port of the collector pipe.

Optionally, the pump seal leakage detection system may comprise a control unit comprising one or more processors, configured to control the air displacement device for activating the air stream upon a signal received by the sensor. The control unit may be located in a housing accommodating the leakage piping or may be located separately from the leakage piping. Preferably, the control unit may be located in a housing accommodating the air displacement device. The air displacement device may be mounted on a printed circuit board (PCB) of the control unit.

Optionally, the pump seal leakage detection system may comprise an evaporator connected to the outlet port of the air stream pipe for collecting blown off leakage drops for evaporation. As a certain leakage rate may be desirable for establishing a lubricating film in the pump seal, a certain allowable amount of leakage fluid will accumulate over time. The evaporator is designed to collect and distribute the accumulated leakage fluid to establish maximal surface contact with the ambient atmosphere for evaporation. The evaporator may comprise one or more venting openings to achieve an evaporation rate that is equal or higher than the allowable leakage rate. The evaporator may comprise a heater or be exposed to waste heat of other nearby components in order to increase the evaporation rate by a higher temperature. The evaporator may further act as a contingency buffer for collecting fluid leaking at a rate above the allowable leakage rate until a user is able to inspect, repair and/or replace the pump seal.

Optionally, the air displacement device may be integrated into the control unit and connected to the air stream pipe by an air duct. Thereby, the electronic components of the control unit and the air displacement device are not exposed to the pump vibration, and only the leakage piping with the sensor, which both may be quite small and light-weighted, may be directly connected to the pump.

Optionally, the air displacement device is an air blower connected to an input port of the air stream pipe. This is less complex than using an air suction device, which would require separating the leakage fluid from the airstream before the leakage fluid enters the air suction device. In the embodiment with an air blower, the outlet port of the air stream pipe may be simply connected with an evaporator.

Optionally, the outlet port of the collector pipe may run laterally into the air stream pipe between an upstream section of the air stream pipe and a downstream section of the air stream pipe. The upstream section may extend from an inlet port of the air stream pipe to where the collector pipe runs in and the downstream section may extend from where the collector pipe runs in to the outlet port of the air stream pipe. The leakage piping may thus comprise two inlet ports, i.e. a first inlet port at the collector pipe for leakage fluid and a second inlet port for the air stream at the air stream pipe, and one outlet port for the air stream plus leakage droplets at the air stream pipe. Optionally, the collector pipe may run laterally into the air stream pipe at an angle, wherein the angle may be acute with the upstream section and obtuse with the downstream section. Thereby, the active droplet formation at the outlet port of the collector pipe into the air stream pipe is facilitated by the angle, because it increases the surface of the leakage fluid that is exposed to the air stream at the outlet port of the collector pipe.

Optionally, the inner diameter of the air stream pipe may be smaller where the collector pipe runs in than in the upstream section and/or the downstream section. Thereby, the Venturi effect may enhance the suctioning of leakage fluid out of the outlet port of the collector pipe into the air stream pipe for active droplet formation and blowing the droplets off towards the outlet port of the air stream pipe.

Optionally, the sensor or an additional sensor may be positioned at the downstream section and configured to detect a leakage drop being blown off the outlet port of the collector pipe by an air stream towards an outlet port of the air stream pipe. Such a downstream sensor may be used to count droplets passing the downstream section for determining the leakage rate.

Optionally, the air stream pipe may be at least partially optically transparent. This is in particular advantageous when an optical sensor is used and the air stream pipe is optically transparent where the optical sensor is located. Thereby, the sensor is not exposed to the leakage fluid and able to detect an optical reflection of the surface of leakage fluid at the outlet port of the collector pipe from a lateral position through the transparent air stream pipe.

Optionally, the air displacement device may be a piezoelectric micro blower. Such an air blower may be designed very small, energy efficient and powerful enough to produce the required air stream flow for blowing off leakage droplets. It may be integrated on a PCB of a control unit, comprising one or more processors on the PCB, receiving signals from the sensor.

Optionally, the air stream pipe and/or the collector pipe may comprise a non-sticking inner surface, preferably comprising silicon, polytetrafluoroethylene-based (PTFE) or a material based thereon. Thereby, any undesirable deposition of dirt, scale, salt, grease, microbiological or other forms of contamination within the leakage piping is minimized.

Optionally, the inner diameter of the collector pipe is less than two millimeters for the leakage drop to show capillary action in the collector pipe. Thereby, even very small amounts of centrifuged leakage fluid collected by the collector pipe will travel to the outlet port of the collector pipe supported by capillary action and fill the collector pipe.

The pump seal leakage detection system according to the first aspect of the present disclosure is retro-fittable to any pump comprising a pump seal and a leakage centrifuge to which the leakage piping can be connected. Preferably, the pump seal leakage detection system is retro-fittable by replacing the pump seal comprising a leakage centrifuge to which the system is connectable.

In accordance with a second aspect of the present disclosure, a pump is provided comprising a pump seal, a leakage centrifuge, and a pump seal leakage detection system according to the previous description. Thus, according to this second aspect, the pump seal leakage detection system may already be installed as part of the pump wherein the inlet port of the collector pipe of the pump seal leakage detection system is connected to a lateral side of the leakage centrifuge in order to receive centrifuged leakage fluid. Thus, the pump and/or the pump seal may be specifically configured to be connected to the pump seal leakage detection. The leakage centrifuge may be part of the pump and/or the pump seal. Preferably, the leakage centrifuge is part of the pump seal being a pre-assembled cartridge shaft seal which can be installed into the pump as an assembly group. Thereby, existing pumps may be retro-fitted with the leakage centrifuge and the leakage detection system by replacing the cartridge shaft seal and connecting the leakage detection system to the new cartridge shaft seal having a leakage centrifuge.

Optionally, the pump may comprise a deflector disc rotatably arranged within the leakage centrifuge for deflecting fluid leaking out of the pump seal towards the inlet port of the collector pipe. Such a deflector disc may support centrifuging the leakage fluid within the leakage centrifuge and deflecting the leakage fluid radially towards the collector pipe.

Optionally, the deflector disc may comprise at least one annular conical surface with an apex angle larger than 120°. Optionally, the deflector disc may comprise an essentially triangular cross-section. Optionally, the deflector disc may form a radially outer strip-off edge for stripping off centrifuged leakage fluid.

Optionally, the leakage centrifuge may comprise at least two separate radial outlet ports for selectable connection with the inlet port of the collector pipe, wherein any one of the at least two outlet ports is selectable for connection with the inlet port of the collector pipe and the other ones of the at least two outlet ports are each sealable by a plug. Thereby, the pump seal leakage detection system, in particular the leakage piping thereof, can be selectively mounted to the pump according to the available space envelope around the pump at the place where the pump is to be installed. Often, the pump is to be installed close to a wall or housing and it is desirable to mount the pump seal leakage detection system at a lateral side away from the wall or housing. Thus, the plurality of outlet ports gives the installer of the pump options for selecting the most convenient lateral side for mounting the pump seal leakage detection system.

Optionally, the pump seal may be a mechanical shaft seal. The mechanical shaft seal may be an integral part of the pump or part of an exchangeable shaft seal cartridge. Optionally, the pump may be a wet-running centrifugal pump, in particular a multi-stage centrifugal pump with a shaft for driving at least one impeller.

In accordance with a third aspect of the present disclosure, a method for detecting a leakage of a pump seal is provided, comprising the following steps:
  centrifuging fluid leaking out of the pump seal within a leakage centrifuge,
  collecting the centrifuged leaked fluid in a collector pipe being connected with an inlet port to the leakage centrifuge and having an outlet port into an air stream pipe,
  detecting a leakage drop at the outlet port of the collector pipe or in the air stream pipe, and
  driving an air stream through the air stream pipe for blowing a leakage drop off the outlet port of the collector pipe towards an outlet port of the air stream pipe.

The method described above allows to detect very small changes to the leakage rate and/or amount with a high accuracy in order to be able to predict an intolerable leakage rate and/or amount earlier than it was by using methods known in the prior art. The step of driving an air stream may be performed before, simultaneously with or after the step of detecting a leakage drop. The leakage drop may form at the outlet port of the collector pipe by the pressure of following centrifuged leakage fluid being pushed into the collector pipe and/or by capillary action through the collector pipe and/or by the Venturi suctioning effect caused by the air stream through the air stream pipe.

Optionally, the step of centrifuging the leaking fluid may be supported by a deflector disc rotating within the leakage centrifuge for deflecting the centrifuged fluid towards the inlet port of the collector pipe. Thereby, even very small amounts of leakage fluid are quickly deflected into the collector pipe so that very small changes in the leakage rate are detectable.

Optionally, the step of detecting a leakage drop may comprise detecting a leakage drop being blown off the outlet port of the collector pipe towards an outlet port of the air stream pipe. Alternatively or in addition, the step of detecting a leakage drop may comprise detecting the optical reflection of the surface of leakage fluid at the outlet port of the collector pipe by an optical sensor, wherein the sensor is positioned at a lateral side of the air stream pipe opposite the outlet port of the collector pipe. The sensor may thus be used to count the number of leakage drops passing the sensor on its way to the outlet port of the air stream pipe and/or the sensor may be used to count the number of drops leaving the outlet port of the collector pipe.

Optionally, the method may further comprise a step of activating the air stream upon a received signal based on the optical reflection of the surface of leakage fluid at the outlet port of the collector pipe. The sensor may thus be used to count the number of air stream activation events, i.e. trigger events.

Optionally, the method may further comprise a step of collecting blown off leakage drops for evaporation in an evaporator. The evaporator may provide a volume where the collected leakage fluid is distributed over a larger surface to establish an evaporation rate that is equal to or larger than an acceptable leakage rate. The evaporation rate may be increased by heating the evaporator or exposing the evaporator to waste heat of the near-by components.

Optionally, the step of driving an air stream comprises blowing air into an inlet port of the air stream pipe. This is less complex than suctioning air into through the outlet port of the airstream pipe which would require separating the leakage fluid from the air stream before it enters the air suction device.

Optionally, the method may comprise a step of determining a leakage rate and/or a change of leakage rate. Such a determined leakage rate and/or change of leakage rate may be communicated wirelessly or via cable to a display for a user, or to a monitoring system. Alternatively or in addition, such a determined leakage rate and/or change of leakage rate may trigger an alarm and/or maintenance request. Thus, optionally, the method may comprise a step of signaling when a rate of detected leakage drops exceeds at least one predetermined limit for taking necessary maintenance action. Optionally, the method may further comprise a step of setting the at least one predetermined limit by a user. Such a user-defined predetermined limit allows for adjusting the limit to the specific pump that is monitored. Optionally, said step of signaling may comprise signaling a characteristic alarm type for each of the at least one predetermined limit exceeded or subsets thereof. Thus, different alarm levels may be user-defined and be characterized by a specific alarm name, tone, color or intensity. Furthermore, different alarm types or levels may be communicated to different users, groups or maintenance personnel by different communication channels. For instance, low level alarms may just be displayed on a monitoring system whereas more critical alarm levels may request attention and/or urgent action by highlighted blinking, ringing, or via audio, visual, vibration alarms on a user mobile phone.

Some or all of the steps of the method described above may be implemented in form of compiled or uncompiled software code that is stored on a computer readable medium with instructions for executing the method. Alternatively or in addition, some or all method steps may be executed by software in a cloud-based system, in particular the control unit may be partly or in full implemented in a cloud-based system with a transmitter/receiver communicating with one or more processors of the cloud-based system.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
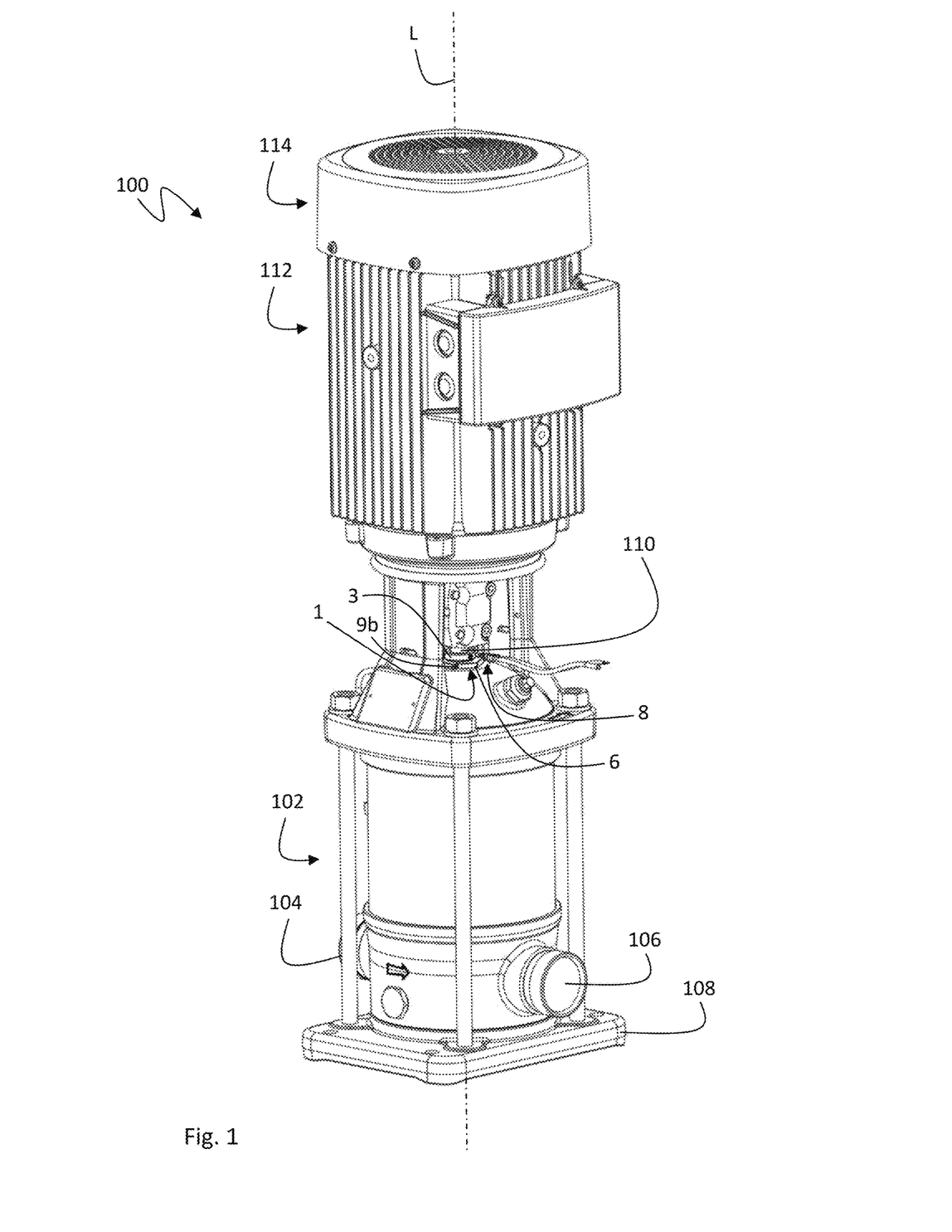
FIG. 1 is a perspective view showing an example of an embodiment of the pump according to the present disclosure.

Referring to the drawings, FIG. 1 shows a pump 100 in form of a multistage centrifugal pump having a pump housing 102 with an internal stack of impellers for pumping fluid from an inlet port 104 to an outlet port 106. The pump housing 102 stands on a bottom base 108. The internal stack of impellers is driven for counter-clockwise rotation by a shaft 110 extending along a vertical longitudinal axis L. For convenience, terms like "upward", "upper", "downward" or "lower" may be used herein to describe the positional relationship between components assuming a vertical longitudinal axis L. In an alternative embodiment, the longitudinal axis L may be horizontal in a designated operating position of the pump. It will be readily understood by the skilled reader that the orientation of the longitudinal axis may be horizontal or different without affecting the positional relationship between components. "Vertical" shall mean an orientation along the gravitational force in a designated operating position of the pump.

The shaft 110 extends vertically through a pump seal 1 in form of a mechanical shaft seal out of an upper side of the pump housing 102 towards a motor housing 112 mounted above the pump housing 102 and comprising a speed-controlled electric motor for driving the shaft 110. An electronics housing 114 is located above the motor housing 112 comprising electronics for controlling the speed-controlled electric motor.

In this example, the pump seal 1 comprises a shaft sleeve 3 fixed to the shaft 110. The pump seal 1 is here a pre-assembled cartridge or module that is placed from top into the pump housing 102. The pump seal 1 can be demounted and/or replaced as an assembly group. The shaft sleeve 3 is rotatably mounted within a stationary part 4 (see FIG. 3) of the shaft seal 1. The stationary part 4 comprises an essentially hexgonally-shaped top flange 6 protruding out of the pump housing 102. A pump seal leakage detection system 8 is connected to one of three radial outlet ports 9a,b,c of the flange 6.

Figure 2:
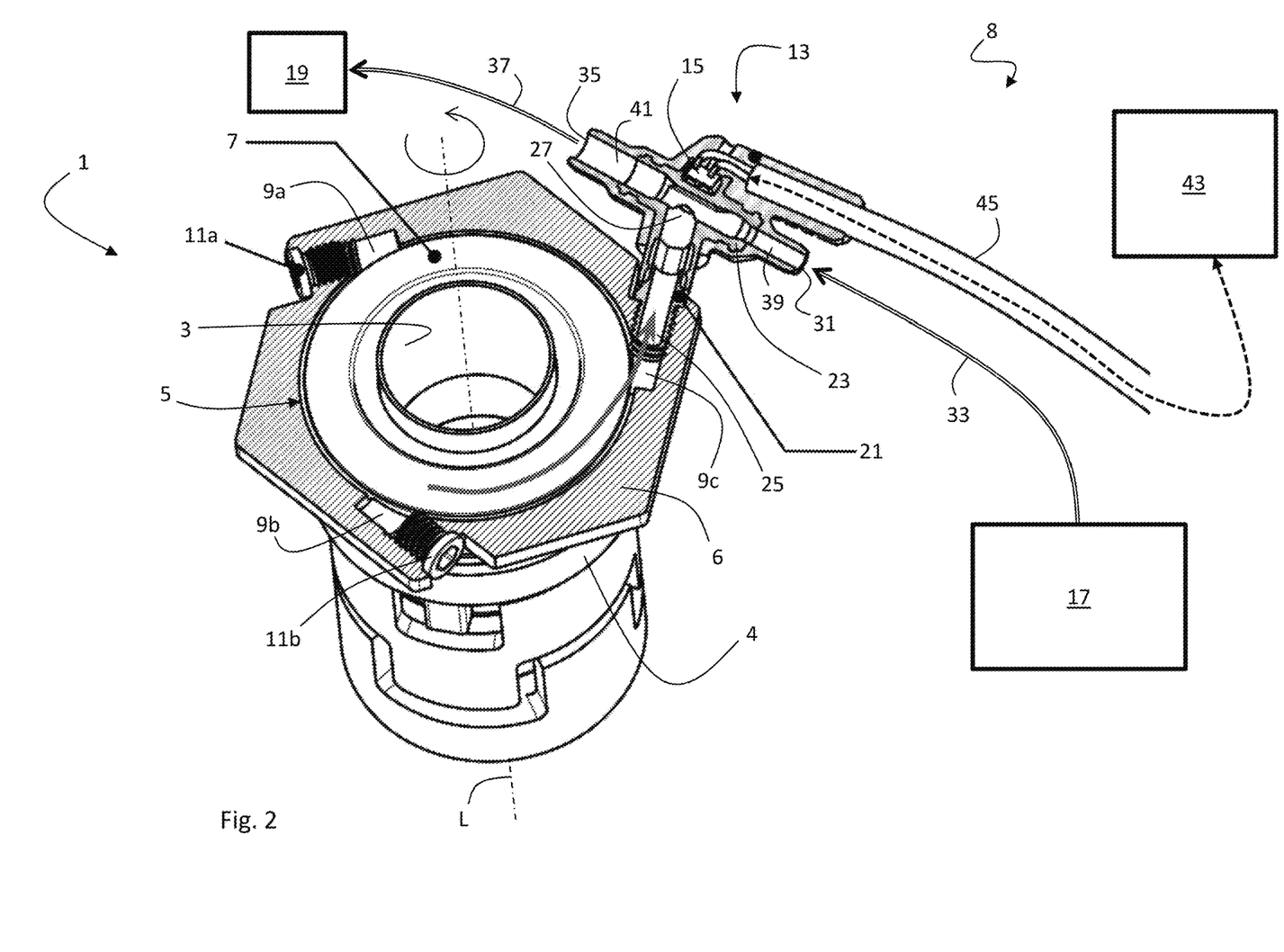
FIG. 2 is a sectional view through parts of an example of an embodiment of the pump seal leakage detection system according to the present disclosure.

FIG. 2 shows the pump seal 1 and the pump seal leakage detection system 8 more closely. The pump seal 1 separates a lower wet section (inner of the pump housing 102) of the pump 100 as shown in FIG. 1 from an upper dry section (outer of the pump housing 102), wherein the shaft 110 extends from the upper dry section into the lower wet section for driving one or more impeller(s) in the wet section. The shaft 110 is rotatable about its longitudinal axis L within the pump seal 1, wherein the stationary part 4 of the pump seal 1 comprises an annular downward-facing sealing surface 2a (see FIG. 3) in sealing contact with a corresponding upward-facing annular sealing surface 2b of a lower rotating part 49 of the pump seal 1 in the wet section of the pump 100. Fluid may leak inward and then upward from the wet section into the dry section through a very thin radial gap in the range of microns or less between the sealing surfaces 2a,b. The leakage fluid may thereby establish a very thin lubricating film between the sealing surfaces 2a,b, which is desirable for minimizing frictional losses, wear or frictional heat.

A leakage centrifuge 5 is located upward from the annular sealing surfaces 2a,b within the hexagonally-shaped flange 6 of the stationary part 4 of the pump seal 1. FIG. 2 shows a cross-sectional cut view through the leakage centrifuge 5. The leakage centrifuge 5 is a peripheral annular volume around the rotating shaft sleeve 3 into which fluid may leak upward from below through the gap between shaft sleeve 3 and the stationary part 4 of the pump seal 1. A deflector disc 7 is coupled to the shaft sleeve 3 and positioned within the leakage centrifuge 5 to rotate therein with the shaft sleeve 3. Leakage fluid entering the leakage centrifuge 5 is centrifuged radially outward by a radial shaft sleeve surface and in particular by the deflector disc 7.

The leakage centrifuge 5 comprises three radial outlet ports 9a,b,c evenly distributed circumferentially at a 120° distance to each other. The outlet ports 9a,b,c extend from a peripheral radial wall of the leakage centrifuge 5 in essentially tangential direction radially outward out of the flange 6. As the designated rotating direction of the shaft 110 is here counter-clockwise when looking downward, the tangential direction of the outlet ports 9a,b,c is also counter-clockwise. Thereby, centrifuged leakage fluid skids into the outlet ports 9a,b,c. The outlet ports 9a,b are not used and each sealed by a plug 11a,b in form of a screw that is accessible from outside of the pump. However, the outlet ports 9a,b represent selectable options for connecting a pump seal leakage detection system 8. Preferably, all outlet ports 9a,b,c may be sealed by plugs 11 when the pump seal 1 is installed into the pump 100, and one selected plug 11c is removed for connecting the leakage detection system 8 once the pump seal 1 is in place.

It should be noted that the pump seal 1 may, in another embodiment, not be a pre-assembled cartridge or assembly group. The deflector disc 7 may then be directly coupled to the shaft 110, and not indirectly via the shaft sleeve 3.

Figure 4:
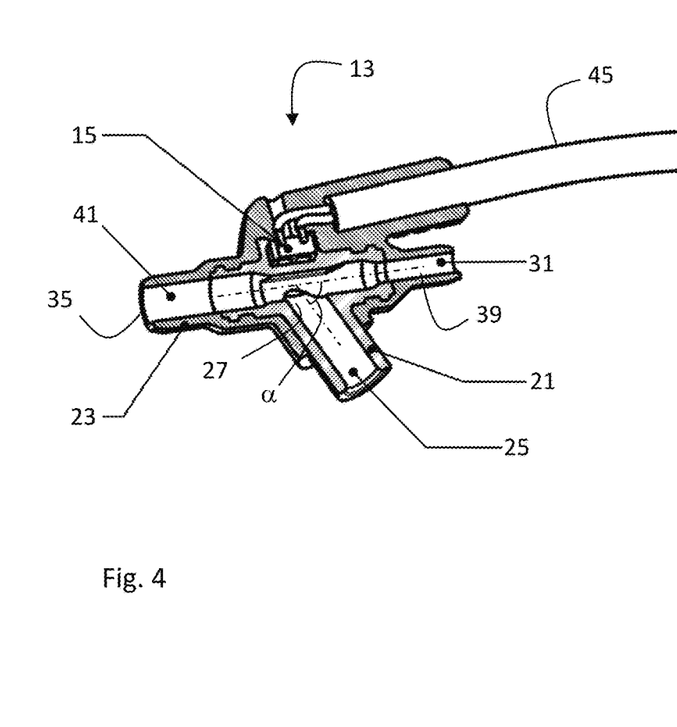
FIG. 4 is a longitudinal sectional view through a leakage piping of an example of an embodiment of the pump seal leakage detection system according to the present disclosure.

The pump seal leakage detection system 8 is here connected to the outlet port 9c of the leakage centrifuge 5. The pump seal leakage detection system 8 as shown in the example of FIG. 2 comprises a leakage piping 13, a sensor 15, an air displacement device 17 and an evaporator 19. As shown in FIG. 2 and FIG. 4, the leakage piping 13 comprises a collector pipe 21 and an air stream pipe 23, wherein the collector pipe 21 comprises an inlet port 25 connected to the outlet port 9c of the leakage centrifuge 5 and an outlet port 27 running laterally into the air stream pipe 23. The collector pipe 21 extends essentially coaxially with the outlet port 9c of the leakage centrifuge 5, i.e. essentially tangentially out of the pump. The inlet port 25 of the collector pipe 21 comprises an outer thread that is essentially identical to the outer thread of the screw plugs 11a,b for water-tight connection with the leakage centrifuge 5.

The air stream pipe 23 comprises an inlet port 31 in fluid connection with the air displacement device 17 in form of an air blower via an air duct 33. The air stream pipe 23 further comprises an outlet port 35 in fluid connection with the evaporator 19 via an air duct 37. The air displacement device 17 is configured to drive an air stream (see double-lined arrows in FIG. 2) through the air stream pipe 23 toward the evaporator 19. The air stream pipe 23 thus comprises an upstream section 39 and a downstream section 41, wherein the upstream section 39 extends from the inlet port 31 of the air stream pipe 23 to where the outlet port 27 of the collector pipe 21 runs in, and wherein the downstream section 41 extends from where the outlet port 27 of the collector pipe 21 runs in to the outlet port 35 of the air stream pipe 23. The inner diameter of the air stream pipe 23 is smaller where the collector pipe 21 runs in than in the upstream section 39 and the downstream section 41 in order to enhance a suctioning Venturi effect on the outlet port 27 of the collector pipe 21. In the shown example, the collector pipe 21 runs laterally into the air stream pipe 23 at an angle α, wherein the angle α is acute with the upstream section 39 and obtuse with the downstream section 41. Thereby, the surface of fluid at the outlet port 27 of the collector pipe 21 exposed to the air stream through the air stream pipe 23 is enlarged compared to running in at 90°.

The sensor 15 is an optical sensor positioned at a lateral side of the air stream pipe 23 opposite the outlet port 27 of the collector pipe 21. The optical sensor 15 is directed towards the outlet port 27 of the collector pipe 21 for detecting the optical reflection of the surface of leakage fluid at the outlet port of the collector pipe. The air stream pipe 23 is optically transparent at the sensor 15 so that the sensor can be placed outside the air stream pipe 23. The sensor 15 is thus configured to detect a leakage drop at the outlet port 27 of the collector pipe 21 or in the air stream pipe 23. The sensor 15 is connected to a control unit 43, comprising one or more processors, via a cable connection 45. The sensor 15 may be powered and/or controlled by the control unit 43 via the cable connection 45. The sensor 15 sends signals to the control unit 43 and receives signals from the control unit 43 via the cable connection 45 (see dashed double-arrow in FIG. 2). Alternatively, or in addition to the cable connection 45, the sensor 15 may wirelessly communicate with the control unit 43. In an alternative embodiment, the control unit 43 and the leakage piping 11 may be located within a common housing.

Figure 3:
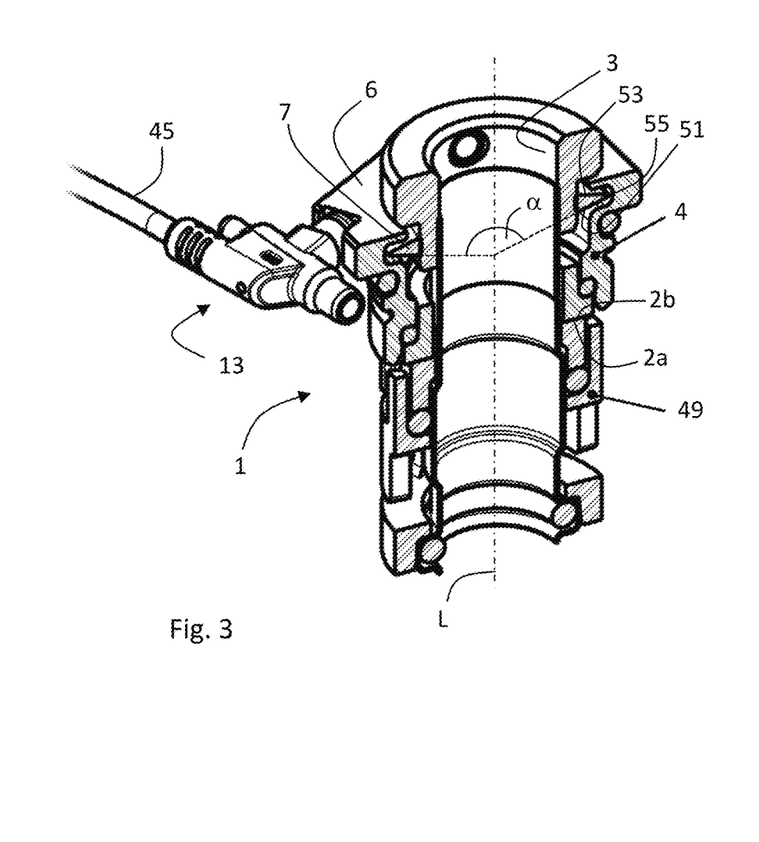
FIG. 3 is a longitudinal sectional view through a pump seal with a leakage piping of an example of an embodiment of the pump seal leakage detection system according to the present disclosure.

FIG. 3 shows the mechanical pump seal 1 with the upper stationary part 4 in the dry section of the pump and a lower rotating part 49 in the wet section of the pump 100 as shown in FIG. 1. The lower rotating part 49 is coupled to the shaft sleeve 3, whereas the shaft sleeve 3 rotates within the upper stationary part 4. The stationary part 4 of the pump seal 1 comprises the annular downward-facing sealing surface 2a in sealing contact with the annular upward-facing sealing surface 2b of the lower rotating part 49 of the pump seal 1. Above the annular sealing surface 2a, the inner diameter of the upper stationary part 4 widens to form the peripheral wall of leakage centrifuge 5 and the flange 6. Any leakage fluid leaking inward through the sealing surfaces 2a,b and then upward between the stationary part 4 of the pump seal 1 and the radial outer shaft sleeve surface is thereby collected in the leakage centrifuge 5.

The deflector disc 7 is coupled to the shaft sleeve 3 and rotates within the leakage centrifuge 5 in order to facilitate centrifuging any leakage fluid collected within the leakage centrifuge 5 radially outward toward the outlet ports 9,a,b,c of the leakage centrifuge 5. The collector pipe 21 of the leakage piping 13 was selected to be connected to port 9c of the ports 9a,b,c, whereas the other non-selected ports 9a,b are sealed by screw plugs 11a,b. The deflector disc 7 comprises a lower annular conical surface 51 facing the wet section and having an apex angle α larger than 120°. Here, the deflector disc 7 has a symmetric shape with a corresponding upper annular conical surface 53 so that the deflector disc 7 has an essentially triangular cross-section. The deflector disc 7 thus forms a radially outer strip-off edge 55 for stripping off centrifuged leakage fluid.

Figure 5:
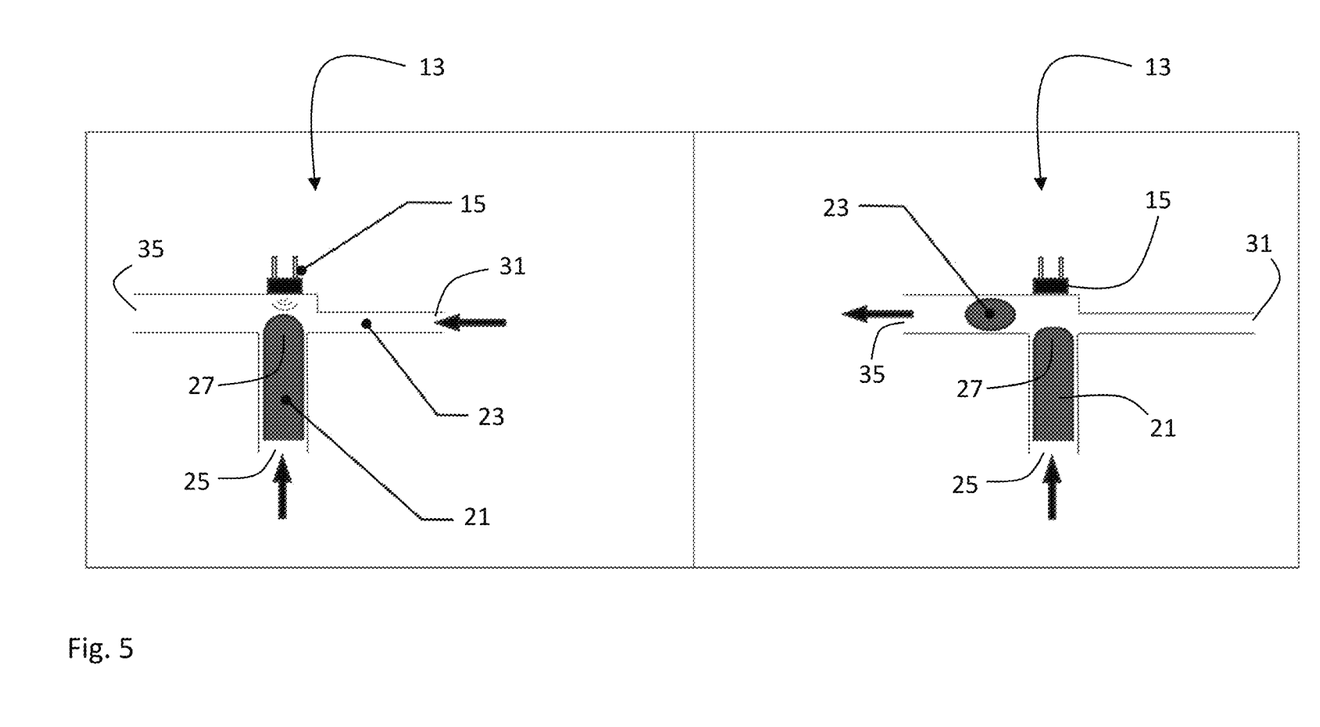
FIG. 5 is a schematic view showing an active leakage fluid droplet formation according to an example of an application of the method according to the present disclosure.

FIG. 5 shows more schematically the active droplet formation within the leakage piping 13 of the system 8. In FIG. 5 on the left, leakage fluid is pushed into the collector pipe 21 by a centrifugal force, a capillary activity, and/or a Venturi suction effect. A leakage fluid drop forms at the outlet port 27 of the collector pipe 21, where it runs laterally into the air stream pipe 23. The optical sensor 15 is positioned at the lateral side of the air stream pipe 23 opposite the outlet port 27 of the collector pipe 21 and directed towards the outlet port 27 of the collector pipe 21 through the optically transparent air stream pipe 23. The sensor 15 is configured to detect a leakage drop at the outlet port 27 of the collector pipe 21 or in the air stream pipe 23.

There are two alternatives for the active droplet formation: in the first alternative, the air stream is already active before the formation of the leakage drop, and in the second alternative, the air stream is activated during the formation of the leakage drop. In the first alternative, the Venturi suction effect may facilitate the droplet formation and/or the fluid transport through the collector pipe 21. The sensor 15 is able to detect a change in the optical reflection of the surface of leakage fluid at the outlet port 27 of the collector pipe 21 when the droplet is blown off the outlet 27 of the collector pipe toward the outlet 35 of the air stream pipe 23 by the air stream. In this first alternative, the sensor 15 or an additional sensor may alternatively be positioned in the downstream section 41 of the air stream pipe 23 in order to count drops passing the downstream sensor. In the second alternative, the sensor 15 positioned as shown in FIG. 5 may trigger the activation of the air stream, i.e. the air displacement device 17 to start driving the air stream or an opening of a valve, when it detects that a leakage drop has formed at the outlet port 27 of the collector pipe 21 to a certain degree. FIG. 5 shows on the left such a moment when leakage drop at the outlet port 27 of the collector pipe 21 bulges due to surface tension with a convex surface into the air stream pipe 23. The leakage drop is thus exposed to the activated air stream and blown off towards the outlet port 35 of the air stream pipe 23 as shown on the right-hand side of FIG. 5. The sensor 15 and/or the control unit 43 connected therewith may count the number of such trigger events and may determine a leakage rate from that.

The air displacement device 17 is in both alternatives configured to blow a leakage drop off the outlet port 27 of the collector pipe 21 by an air stream towards the outlet port 35 of the air stream pipe 23. The air displacement device 17 may continuously, periodically or sporadically blow or may be configured to drive the air stream for a pre-determined time interval upon sensor-triggered activation and with a pre-determined power, air pressure differential and/or air flow rate sufficient to blow a droplet off the outlet port 27 of the collector pipe 21 towards the outlet port 35 of the air stream pipe 23.

Figure 6:
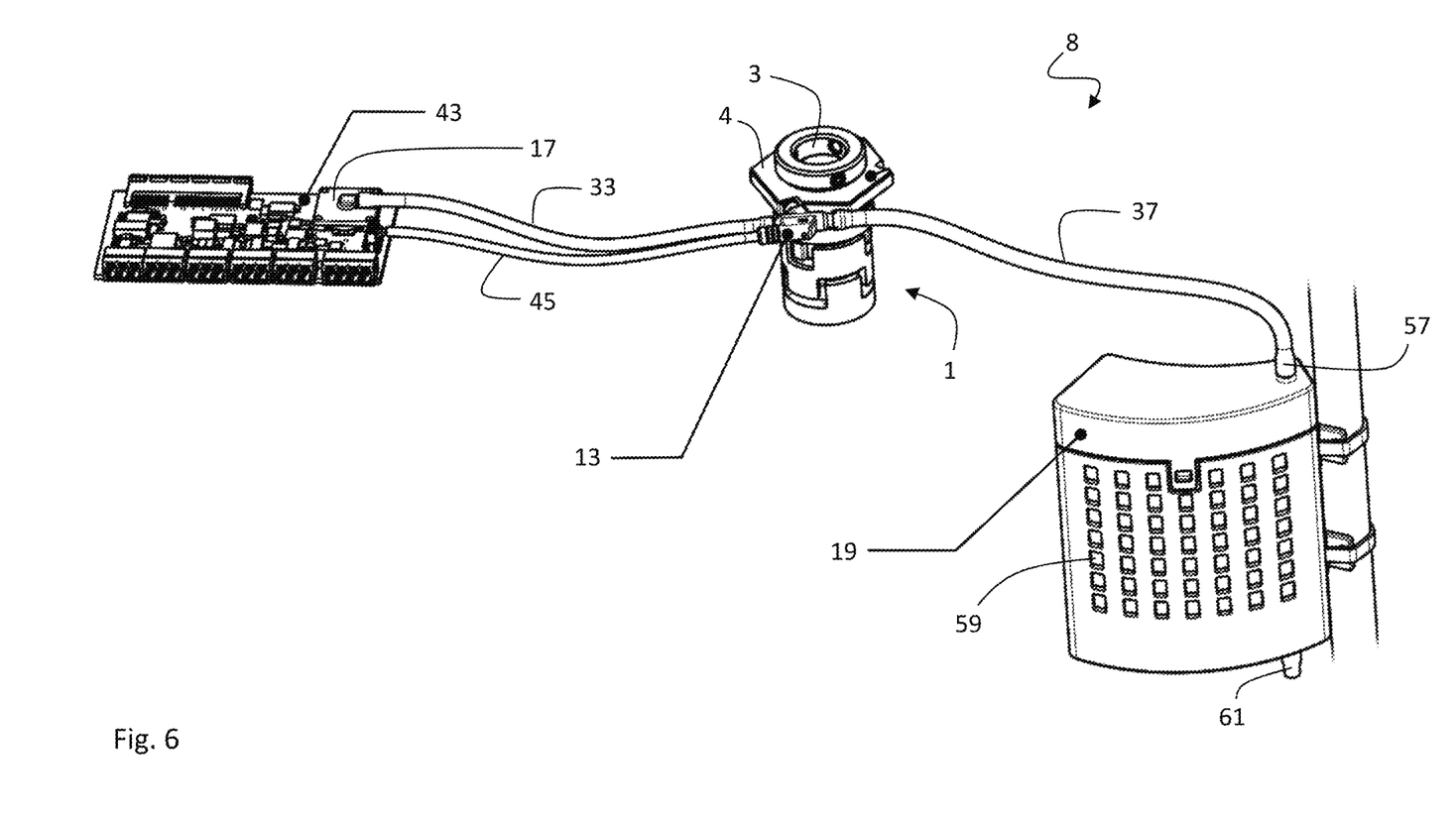
FIG. 6 is a perspective view showing an example of an embodiment of the pump seal leakage detection system according to the present disclosure.

FIG. 6 shows an example of an embodiment in which the air displacement device 17 in form of a piezoelectric micro blower is located on a PCB of the control unit 43. The air displacement device 17 is in fluid connection with the inlet port 31 of the air stream pipe 23 via the air duct 33. The control unit 43 is in signal communication with the sensor 15 located in the leakage piping 13 via cable connection 45 extending essentially in parallel to the air duct 33. The outlet port 35 of the air stream pipe 23 is in fluid connection with the evaporator 19 via the air duct 37. Therefore, the air duct 33 guides the air stream into the air stream pipe 23, whereas the air duct 37 guides the air stream including leakage drops towards the evaporator 19. The air duct 37 runs into a top inlet port 57 of the evaporator 19 in order to allow the leakage drops to drop into the inner volume of the evaporator 19.

Figure 7:
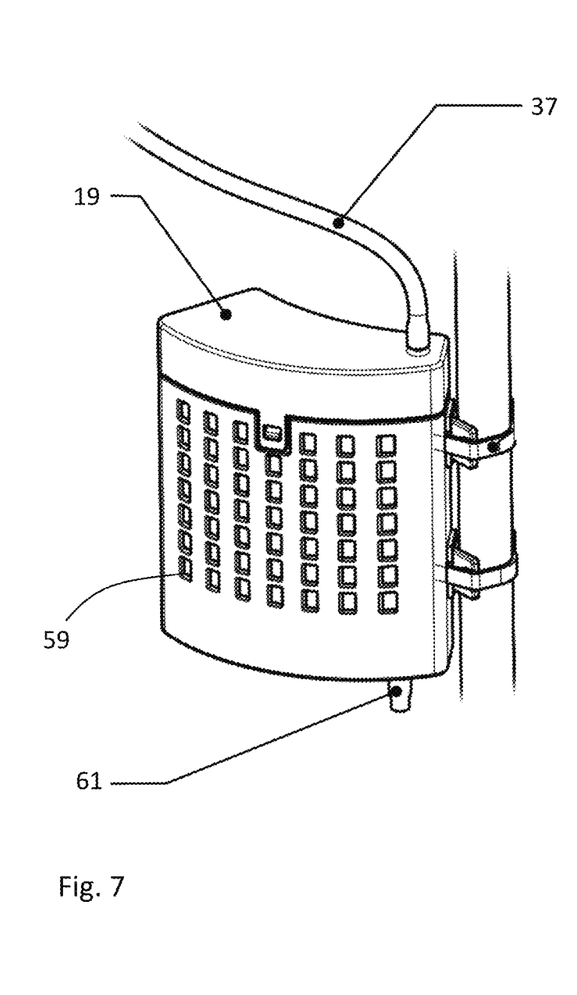
FIG. 7 is a perspective view showing an evaporator of an example of an embodiment of the pump seal leakage detection system according to the present disclosure.
Figure 8:
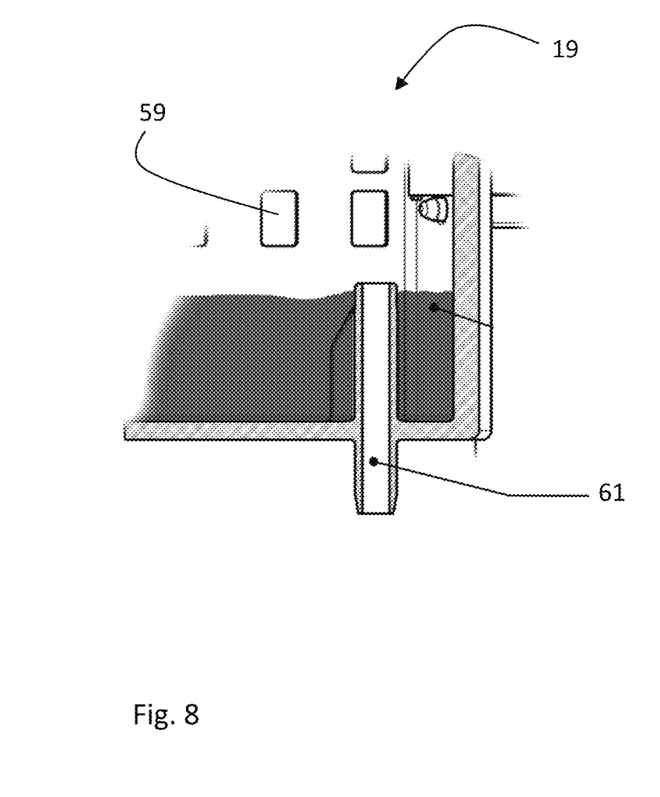
FIG. 8 is a detailed sectional view on a part of an evaporator of an example of an embodiment of the pump seal leakage detection system according to the present disclosure.

FIGS. 7 and 8 show the evaporator 19 in more detail. The evaporator 19 comprises a plurality of lateral venting openings 59 in order to allow for an air exchange within the evaporator 19 to avoid a saturation of air by evaporated leakage fluid. The leakage fluid drops to the bottom of the evaporator 19, where it is distributed to a large surface covering the bottom of the evaporator 19 for achieving a high evaporation rate. The evaporation rate may be increased by heating the bottom of the evaporator or exposing the evaporator to waste heat of near-by components. If the leakage rate exceeds the evaporation rate, the evaporator fills up with leakage fluid as shown in FIG. 8. Before such a situation is reached, the control unit 43 may have triggered at least one alarm that the leakage rate is too high and maintenance of the pump seal 1 is required. The evaporator 19 here comprises an overflow outlet 61 to guide overflow leakage fluid to a drain or another appropriate place where the leakage fluid may not damage components.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

What is claimed is:

1. A pump seal leakage detection system comprising:
    a leakage piping comprising a collector pipe and an air stream pipe, the collector pipe comprising an inlet port connectable to a leakage centrifuge and an outlet port communicating into the air stream pipe;
    a sensor positioned at the air stream pipe, the sensor being configured to detect a leakage drop at the outlet port of the collector pipe or to detect a leakage drop in the air stream pipe or to detect a leakage drop at the outlet port of the collector pipe and to detect a leakage drop in the air stream pipe; and
    an air displacement device for driving an air stream through the air stream pipe, the air displacement device being configured to blow off the leakage drop, at the outlet port of the collector pipe, by the air stream directed towards an outlet port of the air stream pipe, wherein the sensor is an optical sensor for detecting an optical reflection of the surface of leakage fluid at the outlet port of the collector pipe.

2. The pump seal leakage detection system according to claim 1, wherein the sensor is positioned at a side of the air stream pipe opposite the outlet port of the collector pipe.

3. The pump seal leakage detection system according to claim 1, further comprising a control unit configured to control the air displacement device for activating the air stream upon a signal received by the sensor.

4. The pump seal leakage detection system according to claim 3, wherein the air displacement device is integrated into the control unit and connected to the air stream pipe by an air duct.

5. The pump seal leakage detection system according to claim 1, further comprising an evaporator connected to the outlet port of the air stream pipe for collecting blown off leakage drops for evaporation.

6. The pump seal leakage detection system according to claim 1, wherein the air displacement device comprises an air blower connected to an input port of the air stream pipe.

7. The pump seal leakage detection system according to claim 1, wherein the outlet port of the collector pipe runs laterally into the air stream pipe, between an upstream section of the air stream pipe and a downstream section of the air stream pipe.

8. The pump seal leakage detection system according to claim 7, wherein an inner diameter of the air stream pipe is smaller where the collector pipe runs in than in the upstream section or than in the downstream section or than in the upstream section and in the downstream section.

9. The pump seal leakage detection system according to claim 8, wherein the collector pipe runs laterally into the air stream pipe at an acute angle with the upstream section and with an obtuse angle with the downstream section.

10. The pump seal leakage detection system according to claim 7, wherein the sensor is positioned at the downstream section and configured to detect the leakage drop being blown off the outlet port of the collector pipe, by an air stream, towards an outlet port of the air stream pipe.

11. The pump seal leakage detection system according to claim 1, wherein the air displacement device is a piezoelectric micro blower.

12. A pump comprising:
a pump seal;
a leakage centrifuge; and
a pump seal leakage detection system, the pump seal leakage detection system comprising:
a leakage piping comprising a collector pipe and an air stream pipe, the collector pipe comprising an inlet port connectable to the leakage centrifuge and an outlet port communicating into the air stream pipe;
a sensor positioned at the air stream pipe, the sensor being configured to detect a leakage drop at the outlet port of the collector pipe or to detect a leakage drop in the air stream pipe or to detect a leakage drop at the outlet port of the collector pipe and to detect a leakage drop in the air stream pipe;
an air displacement device for driving an air stream through the air stream pipe, the air displacement device being configured to blow off the leakage drop, at the outlet port of the collector pipe, by the air stream directed towards an outlet port of the air stream pipe, wherein the inlet port of the collector pipe of the pump seal leakage detection system is connected to a side of the leakage centrifuge to receive centrifuged leakage fluid; and
a deflector disc rotatably arranged within the leakage centrifuge for deflecting fluid leaking out of the pump seal towards the inlet port of the collector pipe.

13. The pump according to claim 12, wherein:
the leakage centrifuge comprises at least two separate radial outlet ports for selectable connection with the inlet port of the collector pipe and at least one plug; and
any one of the at least two outlet ports is selectable for connection with the inlet port of the collector pipe and the other ones of the at least two outlet ports are each sealable by the at least one plug.

14. The pump according to claim 12, wherein the pump is a wet-running multi-stage centrifugal pump with a shaft for driving at least one impeller.

15. A method for detecting a leakage of a pump seal, the method comprising the steps of:
centrifuging fluid leaking out of the pump seal within a leakage centrifuge;
collecting the centrifuged leaked fluid in a collector pipe being connected with an inlet port to the leakage centrifuge and having an outlet port into an air stream pipe;
detecting a leakage drop at the outlet port of the collector pipe or in the air stream pipe; and
driving an air stream through the air stream pipe for blowing the leakage drop off the outlet port of the collector pipe towards an outlet port of the air stream pipe, wherein the step of centrifuging the leaking fluid is supported by a deflector disc rotating within the leakage centrifuge for deflecting the centrifuged fluid towards the inlet port of the collector pipe.

16. The method according to claim 15, wherein:
the step of detecting the leakage drop comprises detecting an optical reflection of the surface of leakage fluid at the outlet port of the collector pipe by an optical sensor; and
the sensor is positioned at a side of the air stream pipe opposite the outlet port of the collector pipe.

17. The method according to claim 15, further comprising the step of activating the air stream upon a received signal based on an optical reflection of the surface of leakage fluid at the outlet port of the collector pipe.

18. The method according to claim 15, further comprising the step of signaling when a rate of detected leakage drops exceeds at least one predetermined limit for taking maintenance action.

* * * * *